(12) United States Patent
Murakami

(10) Patent No.: US 7,128,193 B2
(45) Date of Patent: Oct. 31, 2006

(54) TORQUE LIMITER

(75) Inventor: Hiroaki Murakami, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 102 days.

(21) Appl. No.: 10/961,150

(22) Filed: Oct. 12, 2004

(65) Prior Publication Data
US 2005/0087419 A1 Apr. 28, 2005

(30) Foreign Application Priority Data
Oct. 22, 2003 (JP) ............................. 2003-362487
Jun. 2, 2004 (JP) ............................. 2004-164156

(51) Int. Cl.
*F16D 7/02* (2006.01)
(52) U.S. Cl. .................... 192/48.8; 192/56.57
(58) Field of Classification Search ............. 192/56.57, 192/56.54; 464/36
See application file for complete search history.

(56) References Cited

U.S. PATENT DOCUMENTS 3,493,089 A * 2/1970 Haskins ..................... 192/48.8
3,602,346 A * 8/1971 Daugherty ................. 192/48.8
5,630,490 A * 5/1997 Hudson et al. .......... 192/223.3

\* cited by examiner

*Primary Examiner*—Rodney H. Bonck
(74) *Attorney, Agent, or Firm*—Manabu Kanesaka

(57) ABSTRACT

A torque limiter limits transmission of torque between a drive shaft and an output shaft. The torque limiter includes a first rotational plate connected to the drive shaft, a second rotational plate facing the first rotational shaft and connected to the output shaft to be movable along an axial direction thereof, a ball ramp portion provided between the first rotational plate and the second rotational plate, a ball retained in the ball ramp portion, and a spring portion for pressing between the first rotational plate and the second rotational plate. A ball channel is formed in at least one of the first rotational plate and the second rotational plate. The ball in the ball ramp portion falls in the ball channel when the torque between the drive shaft and the output shaft exceeds a predetermined value to shut off the transmission of the torque.

6 Claims, 4 Drawing Sheets

13 input plate side 14 output plate side 3 input plate side driving force channel inclination pressing force 4 output plate side

TORQUE LIMITER

BACKGROUND OF THE INVENTION AND RELATED ART STATEMENT

The present invention relates to a power transmission system for a general industrial device and an aircraft. More specifically, the present invention relates to a torque limiter in which a coupling portion for transmitting a rotational force shuts off or separates when a load exceeds a predetermined value.

A movable wing surface forming a part of a flight control system of an aircraft is called a rudder surface (flying wing surface or moving wing), and includes an aileron provided on a main wing as a main rudder surface, and an elevator and a rudder provided on a tail wing. The movable wing surface also includes a slat, a posterior-border slap, a flight spoiler, a gland spoiler and so on provided on the main wing as an accessory rudder surface. The main wing is composed of a wing and respective rudder surfaces (slat, slow speed aileron, high speed aileron, flight spoiler, gland spoiler and posterior-border slap). An aircraft body is controlled through an operation of the rudder surfaces and the tail swing.

FIG. 3 shows a high-lift system of an aircraft. The high-lift system is a system in which a rudder surface of a flap/slat provided in a main wing is operated in order to obtain lift of the aircraft when the aircraft takes off and lands. It is necessary to operate each rudder surface of the right and left wings simultaneously (left rudder surfaces 33a and 34a, and right rudder surfaces 33b and 34b). A drive motor 30 is disposed in the middle portion of the aircraft for rotating right and left torque shafts 32 simultaneously through a gear box 31. In view of safety, it is necessary to operate the right and left rudder surfaces symmetrically (left rudder surfaces 33a and 34a, and right rudder surfaces 33b and 34b).

FIG. 4(a) is a view showing a high-lift system equipped with torque limiters (left wing torque limiter 35a and right wing torque limiter 35b). The high-lift system has power for operating the right and left rudder surfaces with one drive motor 30. The torque limiter limits torque transmitted to the left and right sides only as necessary and prevents excess torque from being transmitted. With the torque limiters, it is possible to reduce a size and weight of a component at a downstream side of the torque limiter as the torque limiter limits the maximum output torque.

The torque limiter of the high-lift system needs to shut off torque greater than a required torque for driving one wing, and needs to rotate the right and left shafts symmetrically within a predetermined level. The torque limiter mainly includes one type in which a shaft is fixed to a case and the other type in which a shaft becomes free for shutting off torque. In the high-lift system, since it is necessary to operate the right and left wings symmetrically, the type in which a shaft is fixed to a case is used. In the torque limiter in which a shaft is fixed to a case, it is necessary to stop the shaft instantly. Accordingly, when the torque limiter is operated, a large surge torque is generated due to inertial energy of the drive motor 30, so that a measure for controlling the surge is separately required.

FIG. 4(b) is a view showing a high-lift system equipped with a surge torque buffering apparatus 36. In the high-lift system, a torque limiter in which a shaft is fixed to a casing is provided on an output shaft of each of left and right wings (left wing torque limiter 35a, right wing torque limiter 35b). The surge torque buffering apparatus 36 is provided for reducing the surge torque generated by inertial energy. The surge torque buffering apparatus 36 is formed of a spring and the like.

FIG. 5 is a cross sectional view of a torque limiter in which an output shaft 2 is to be fixed. An input plate 3 connected to a drive shaft 1 is fitted in a bearing provided in a housing 9. At an opposite side, the output shaft 2 is supported on a bearing provided in the input plate 3 and a bearing provided in a housing 10. The input plate 3 is connected to the drive shaft 1 to rotate, and the output plate 4 is capable of rotating and moving on the output shaft 2 in an axial direction. An output plate 4 is fitted into the output shaft 2 to be movable back and forth. A ball ramp portion 5 is disposed between the input plate 3 and the output plate 4, and has lamp channels wherein a ball 6 is retained. A preload spring 7 is provided for pressing the ball ramp portion 5 in an axial direction so that the ball ramp portions 5 is not activated up to a certain torque. A brake portion 8 increases a torque according to a load in an axial direction generated when the ball ramp portion 5 is activated.

FIG. 6 shows a structure of the ball ramp portion 5. An upper portion in FIG. 6 is a side of the input plate 3, and a lower portion in FIG. 6 is a side of the output plate 4. Lamp channels with smooth slopes are provided on both sides for sandwiching the ball 6. The preload spring 7 presses the output plate 4. A depth and a size of the lamp channel and a size of the ball 6 are determined such that the ball ramp portion 5 is not activated up to a certain torque.

When the input plate 3 rotates, the lamp channel at a side of the input plate 3 moves in the right direction in FIG. 6. As a result, a driving force (torque) acts in an arrow direction through the ball 6, and a pressing force acts in an arrow direction on the output plate 4. When a torque greater than a predetermined value is applied, the input plate 3 moves further in the right direction in FIG. 6. As a result, the ball 6 rolls against resistance of the output plate 4 pressed by the preload spring 7 with a certain force, and increases a distance between the both plates. Accordingly, the brake portion 8 stops the output plate 4, thereby shutting off the torque to the output shaft 2. As described above, when a rotating torque greater than a predetermined value is applied to the drive shaft 1, the coupling portion for transmitting the rotational drive limits the torque transmission.

Another type of torque limiter is able to shut off a torque when an overload is applied and maintain a position of the shut off (for example, refer to Japanese Patent Publication (Kokai) No. 07-293576).

In the conventional torque limiter with the structure described above, when the transmitting torque exceeds a predetermined value, the torque limiter instantly stops the rotational shaft, thereby generating a torque surge due to inertia of the rotational body. In order to reduce the torque surge, it is necessary to provide the surge torque buffering apparatus 36 such as a slip clutch as shown in FIG. 4(b), thereby increasing cost and weight, and lowering reliability.

In the view of the problems described above, the present invention has been made, and an object of the present invention is to provide a torque limiter with low cost, light weight and high reliability, wherein a downstream portion of a system is not affected when the transmitting torque exceeds a predetermined value due to the torque surge and so on.

Further objects and advantages of the invention will be apparent from the following description of the invention.

SUMMARY OF THE INVENTION

In order to achieve the objects described above, according to the present invention, a torque limiter includes a ball ramp portion having lamp channels for retaining a ball between a rotational plate of a drive shaft and a rotational plate movable on an output shaft in an axial direction; a spring portion for pressing the ball ramp portion in the axial direction to prevent the ball ramp portion from being activated up to a certain torque; and a torque transmitting portion wherein a torque increases according to a load in an axial direction when the ball ramp portion is activated. In the torque limiter, the ball channels are provided in the rotational plates for allowing the ball in the ball ramp portion to move from the lamp channels and fall therein against a force of the spring portion when the transmitting torque exceeds a predetermined value, so that the torque is not transmitted through a displacement in the axial direction when the ball ramp portion is activated.

According to the present invention, a torque limiter includes ball ramp portions provided on both sides of opposing rotational plates of a drive shaft and having lamp channels wherein a ball is sandwiched; and spring portions provided on both sides of the opposing rotational plates for pressing in an axial direction, so that when one of the ball ramp portions is activated, a load in the axial direction induces activation of the other of the ball ramp portions. As a result, the driving torque is simultaneously applied to both output shafts.

In the present invention, the torque limiter is structured as described above, and formed of the ball ramp portion having the lamp channels for retaining the ball; the spring portion; and the torque transmitting portion. When the transmitting torque exceeds a predetermined value, the ball moves over the lamp channels of the ball ramp portion against the preload spring force, and the ball falls in the ball channels provided separately. Accordingly, a length of the ball ramp portion in the axial direction is shortened, thereby reducing the load of the spring portion. As a result, a torque that the torque transmitting portion can transmit decreases, so that an upstream portion and a downstream portion of the system are separated.

In the present invention, the ball ramp portions including the lamp channels for retaining the ball and the spring portion for pressing in an axial direction are provided on the both sides of the opposing rotational plates of the drive shaft. When one of the ball ramp portions is activated, the load in an axial direction eliminates the restriction of the preload force. Accordingly, the torque transmitting portion moves in a direction that the ball moves off, so that the other of the ball ramp portions is induced to activate. As a result, the pressing force from the torque transmitting portion through the ball disappears, so that the driving torque is not transmitted to the both output shafts.

In the present invention, the torque limiter is structured as described above. When the transmitting torque exceeds a predetermined value, the ball in the ball ramp portion falls in the ball channels provided separately, and an upstream portion and a downstream portion of the system are separated. Accordingly, as compared with a conventional torque limiter, the shafts do not stop suddenly, thereby reducing the torque surge and limiting the torque. Further, not only the side wherein an abnormal torque is generated, but also the other side operates simultaneously to separate the upstream and downstream portions of the system, so that the torque surge can be prevented. Further, it is possible to prevent a situation where just one of rudder surface operates.

In the present invention, it is possible to easily manufacture the torque limiter merely by forming the ball channels in the ball ramp portion in addition to the lamp channels formed in the conventional structure. Accordingly, it is possible to provide a system with such a torque limiter with low cost, light weight and high reliability without providing a separate surge torque buffering apparatus and a brake portion.

DETAILED DESCRIPTION OF PREFERRED EMBODIMENTS

According to an embodiment of the present invention, it is possible to provide a torque limiter with low cost, light weight and high credibility in a power transmission system without providing a buffering apparatus for reducing a torque surge generated by inertia of a rotational body.

Figure 1:
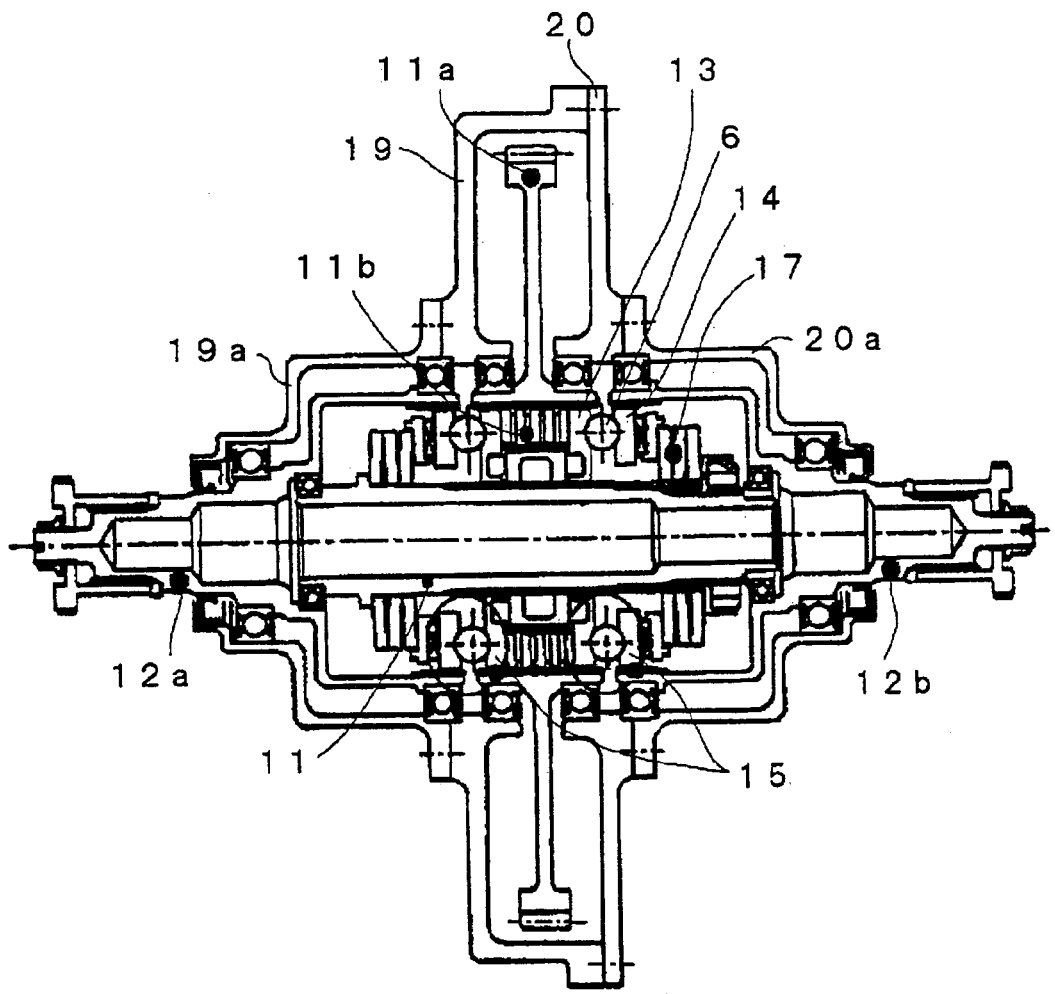
FIG. 1 is a view showing a torque limiter according to an embodiment of the present invention.
Figure 2:
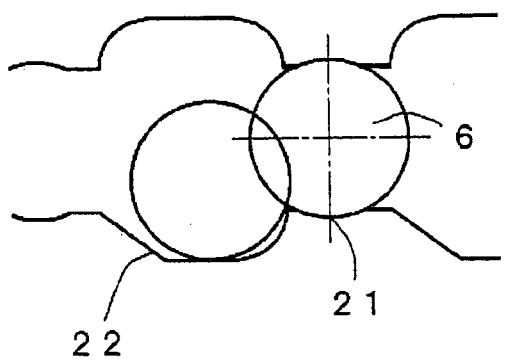
FIG. 2 is a view showing a ball ramp portion of the torque limiter according to the present invention.
Figure 3:
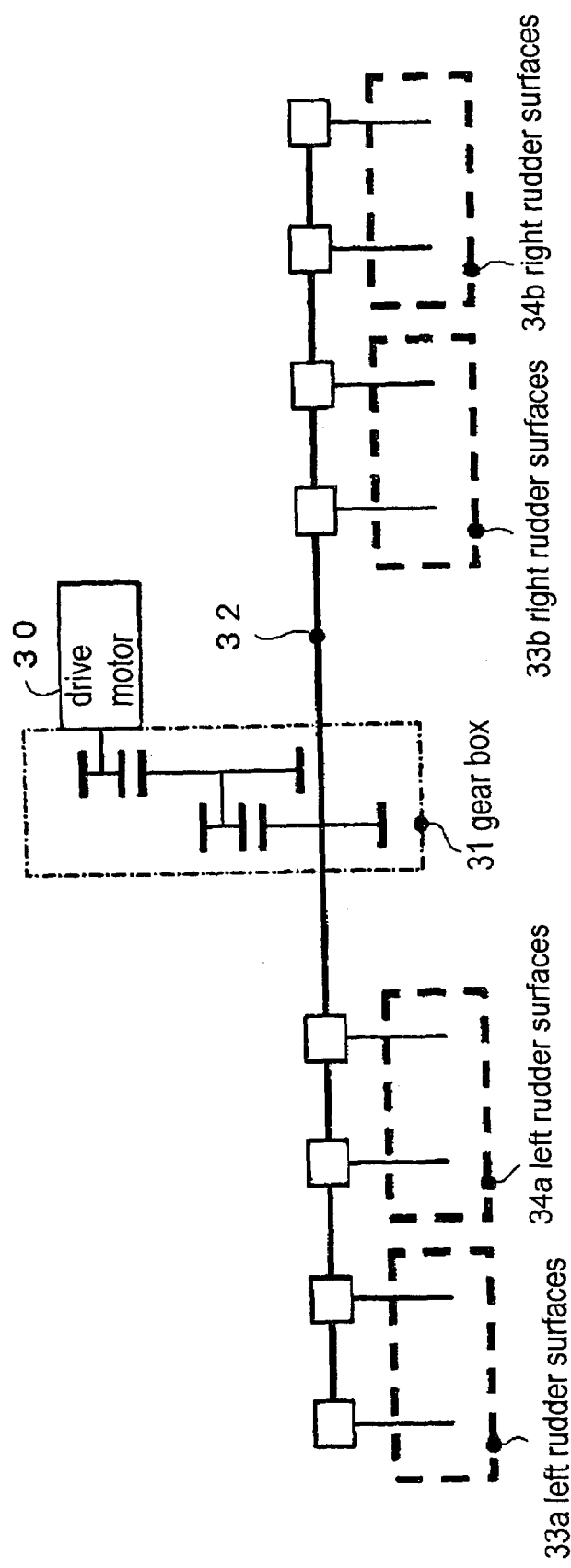
FIG. 3 is a drawing for explaining a power transmission mechanism of a high-lift system of an aircraft.
Figure 4:
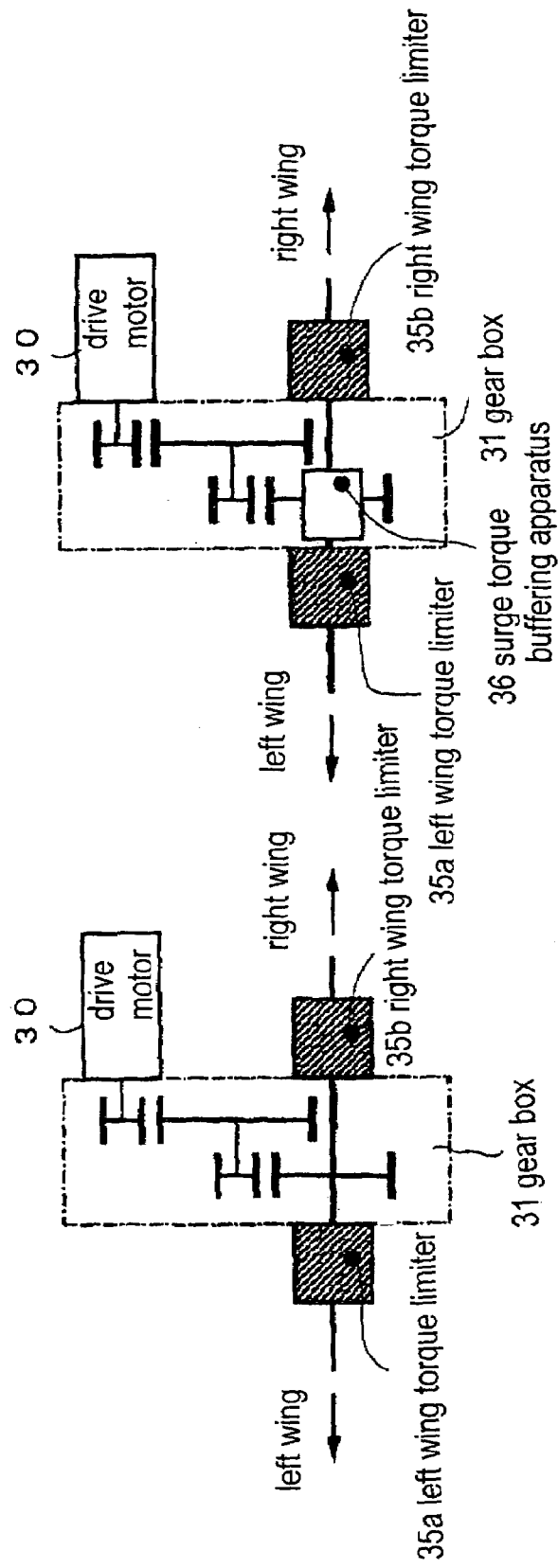
FIGS. 4(a) and 4(b) are views for explaining a power transmission torque limiter and a surge torque buffering apparatus in a power transmission system of right and left wings of an aircraft.

FIG. 1 is a cross-sectional view of a torque limiter according to an embodiment of the present invention. FIG. 2 is a cross-sectional view of a ball ramp portion 15 of the torque limiter according to the present invention. The torque limiter is composed of two rotational input plates 13 provided on a drive shaft 11 at both sides of a drive gear 11a through torque transmitting portions 11b; right and left output plates 14 disposed in right and left output shafts 12a and 12b to be movable along an axial direction thereof; and ball ramp portions 15 having two channels, i.e. ball ramp channels 21 wherein balls 6 are sandwiched between the both plates, and ball channels 22 wherein the balls 6 fall in. With a torque above a predetermined value, the balls 6 move over the ball ramp channels 21 and fall in the ball channels 22, so that a distance between the input plates 13 and the output plates 14 is shortened and a transmission system between the drive shaft 11 and the output shafts 12a and 12b is disconnected. The torque limiter is also composed of preload springs 17 for pressing the ball ramp portions 15 in an axial direction through the output plates 14 to prevent the ball ramp channels 21 from being activated up to a predetermined torque.

Figure 5:
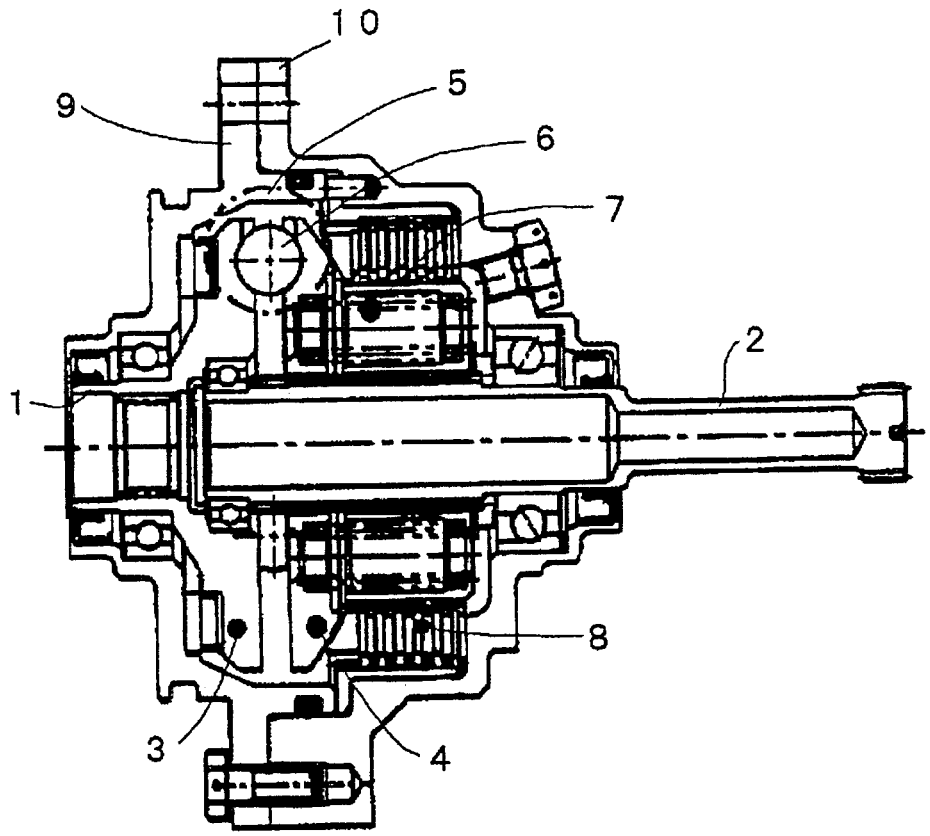
FIG. 5 is a view showing a conventional torque limiter.
Figure 6:
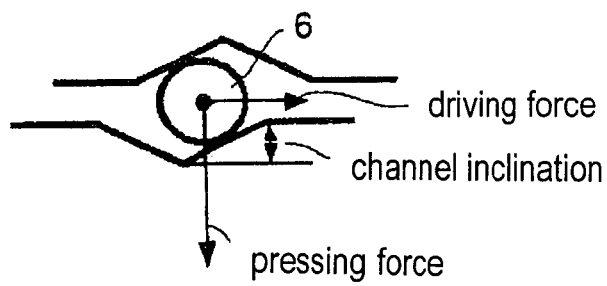
FIG. 6 is a view showing a ball ramp portion of the conventional torque limiter.

Differences between the torque limiter and a conventional torque limiter are as follows. As shown in FIG. 6, in the conventional torque limiter, lamp channels of the ball ramp portion 5 are formed of slopes with a certain degree. An axial directional component force available for the brake portion 8 shown in FIG. 5 and a spring force of the preload spring 7 have a proportional relationship. When a torque exceeds a predetermined value, the brake portion 8 applies brake and stops the drive shaft 1, so that the driving torque is not transmitted to the output shaft 2.

On the other hand, as shown in FIG. 2, the torque limiter of the invention is provided with the ball channels 22 in the ball ramp portions 15 in addition to the ball ramp channels 21, so that the balls 6 fall in the ball channels when the transmitting torque exceeds a predetermined value. When the balls 6 fall in, a load of the preload springs 17 is reduced, and a torque that the torque transmitting portion 11b can transmit decreases. Accordingly, a distance between the input plates 13 and the output plates 14 is shortened, and an upstream portion and a downstream portion of the system are separated. With this structure, it is possible to limit a torque and prevent the torque surge without the brake portion 8 shown in FIG. 5.

A configuration of each component of the torque limiter will be explained next. The drive gear 11a is supported with bearings provided in housings 19 and 20, and the input plates 13 are disk-shape plates corresponding to the output shafts 12a and 12b and provided on left and right sides of the torque transmitting portion 11b of the drive gear 11a. The ball ramp channel 21 of the ball ramp portion 15 and the ball channel 22 are provided in one surface of the input plate 13. The ball ramp portions 15 are located at a circumferential portion, so that a torque is transmitted with a force at an accurate angle.

The output plates 14 are disposed to be movable in an axial direction on inner circumferences of the output shafts 12a and 12b supported by bearings provided in the housings 19a and 20a. The preload springs 17 press the output plates 14 from behind with a certain force, so that the ball ramp portions 15 are not activated up to a specific torque. The ball ramp portions 15 are provided at more than three positions on the opposing surfaces of the input plates 13 and the output plates 14, so that the preload springs 17 press the ball ramp portions 15 in an axial direction uniformly with a certain force.

The balls 6 are sandwiched between the input and output plates 13 and 14. The balls 6 roll in the ball ramp channels 21 and fall in the ball channels 22. When a torque exceeds a predetermined value, the balls 6 move over the ball ramp channels 21 and fall in the ball channels 22, thereby shortening a distance between the input plates 13 and the output plates 14 in an axial direction. As a result, the drive shaft 11 is separated from the output shafts 12a and 12b in terms of the torque transmission, and an upstream portion and a downstream portion of the system are separated. With this structure, it is not necessary to provide the brake portion 8 shown in FIG. 5, and the torque can be limited without generating the torque surge.

A plurality of the preload springs 17 is provided on the rear surfaces of the output plates 14 inside the output shafts 12a and 12b along a circumferential direction. The preload springs 17 push the output plates 14 uniformly with a certain force in an axial direction through intermediate metal fittings, so that the ball ramp portions 15 are pressed in an axial direction, thereby preventing the ball ramp channels 21 from being activated up to a predetermined torque.

An operation of the torque limiter will be explained next. The ball ramp portions 15 are respectively provided between the drive shaft 11 and the right and left output shafts 12a and 12b through the input plates 13 and the output plates 14. When the drive gear 11a is rotated, the drive torque is transmitted to the input plates 13 through the torque transmitting portion 11b. The preload springs 17 apply preload to the ball ramp portions 15 from the right and left sides. The preload springs 17 push the output plates 14 with a certain force in an axial direction, so that the force is transmitted to the balls 6 in the ball ramp portions 15 and allows the output shafts 12a and 12b to rotate.

In a normal state, the torque limiter operates as described above. When a torque above a predetermined value is applied on one of the right and left output shafts 12a and 12b, the balls 6 in the ball ramp portion 15 of the one of the right and left output shafts 12a and 12b move over the ball ramp channels 21 against the preload of the preload springs 17, and fall in the ball channel 22 provided separately. As a result, a length of the ball ramp portion in the axial direction is shortened, so that the preload of the preload springs 17 decreases. At this time, since the torque transmitting portion 11b does not receive the preload of the preload springs 17, the torque transmitting portion 11b moves in a direction that the balls 6 move off by the preload of the preload springs 17 at the other side where the balls 6 are still held, so that the balls 6 at the other side also fall in the ball channel 22. Accordingly, the torque transmitting portion 11b no longer applies a pressing force through the balls 6 to the right and left sides, so that the drive torque is not transmitted to the output shafts 12a and 12b.

Namely, in case the output plate does not rotate in association with the input plate by generation of abnormal situation occurring at the output shaft or a portion to which the output shaft is connected to thereby cause an abnormal torque opposite to a rotational direction in the normal situation, the balls are disengaged from the groove. Incidentally, in the above embodiment, the balls in the ball channel 22 do not automatically return to the original position when the abnormal situation is eliminated. The torque limiter must be disassembled and set once again.

As described above, in the power transmission systems at the right and left sides, not only one power transmission system wherein an abnormal torque is generated shuts off the torque transmission, but also the other power transmission system simultaneously associates with the one power transmission system, so that the both power transmission systems shut the torque transmission. Accordingly, it is possible to prevent asymmetric operation of left and right rudder surfaces, which is critical especially in the aircraft.

The embodiments described above are applied to the torque limiter having the output shafts 12a and 12b in two directions. The invention is applicable to a torque limiter having an output shaft in one direction.

The disclosures of Japanese Patent Applications No. 2003-362487 filed on Oct. 22, 2003 and No. 2004-164156 filed on Jun. 2, 2004 are incorporated in the application.

While the invention has been explained with reference to the specific embodiments of the invention, the explanation is illustrative and the invention is limited only by the appended claims.

What is claimed is:

1. A torque limiter system for limiting torque transmitted between a drive shaft and a first and second output shaft, comprising first and second torque limiters, each torque limiter comprising:
    a first rotational plate connected to the drive shaft,
    a second rotational plate facing the first rotational plate and connected to the output shaft to be movable along an axial direction thereof,
    a ball ramp portion provided between the first rotational plate and the second rotational plate,
    a ball retained in the ball ramp portion, and
    a ball channel formed in at least one of the first rotational plate and the second rotational plate so that the ball in the ball ramp portion falls in the ball channel when the torque between the drive shaft and the output shaft exceeds a predetermined value to shut off the transmission of the torque; and at least one spring portion formed on one of the first and second torque limiters, said at least one spring portion pressing between the first rotational plate and the second rotational plate, wherein the first torque limiter is disposed at one side of the drive shaft, and the second torque limiter is disposed at the other side thereof, said torque limiters being arranged so that an axial load generated at the ball ramp portion of one of the two torque limiters affects an axial load at the ball ramp portion of the other of the two torque limiters to thereby transmit a driving torque to the two torque limiters co-effectively.

2. A torque limiter system according to claim 1, further comprising a torque transmitting portion disposed between the drive shaft and the first rotational plate for transmitting the torque from the drive shaft to the first rotational plate.

3. A torque limiter system according to claim 1, wherein said ball ramp portion includes ramp channels formed at the first and second rotational plates.

4. A torque limiter system according to claim 1, wherein said torque limiters are arranged symmetrically relative to the drive shaft.

5. A torque limiter system according to claim 1, wherein said at least one spring portion comprises one spring portion formed on the first torque limiter without providing a spring portion on the second torque limiter.

6. A torque limiter system according to claim 1, further comprising a torque transmitting portion slidably disposed on the drive shaft and connected to the first rotational plates so that the axial load generated at the ball ramp portion of one of the two torque limiters affects the axial load at the ball ramp portion of the other of the two torque limiters.

* * * * *